(12) United States Patent
Shirai et al.

(10) Patent No.: US 6,556,283 B2
(45) Date of Patent: Apr. 29, 2003

(54) ELECTRONIC DISTANCE METER

(75) Inventors: Masami Shirai, Saitama (JP); Shinichi Suzuki, Saitama (JP); Homu Takayama, Saitama (JP)

(73) Assignees: Pentax Corporation, Tokyo (JP); Pentax Precision Co., Ltd., Tokyo (JP)

( * ) Notice: Subject to any disclaimer, the term of this patent is extended or adjusted under 35 U.S.C. 154(b) by 0 days.

(21) Appl. No.: 09/849,311

(22) Filed: May 7, 2001

(65) Prior Publication Data

US 2002/0012114 A1 Jan. 31, 2002

(30) Foreign Application Priority Data

May 9, 2000 (JP) ........................................ 2000-135561

(51) Int. Cl.[7] ........................... G01C 3/08; G02B 23/00; G02B 27/40; G02B 27/64; G02B 7/04
(52) U.S. Cl. ..................... 356/5.01; 359/426; 250/201.2
(58) Field of Search ............................... 356/3.01–5.15; 396/106; 359/426; 250/201.2

(56) References Cited

U.S. PATENT DOCUMENTS

| | | | | |
|---|---|---|---|---|
| 3,464,770 A | * | 9/1969 | Schmidt | 356/4 |
| 4,167,329 A | * | 9/1979 | Jelalian et al. | 356/5 |
| 4,566,773 A | * | 1/1986 | Kaneda | 354/403 |
| 4,916,324 A | * | 4/1990 | Meier | 250/561 |
| 5,061,062 A | * | 10/1991 | Schneiter | 356/1 |
| 5,206,697 A | * | 4/1993 | Schwartz | 356/5 |
| 5,283,622 A | * | 2/1994 | Ueno et al. | 356/4 |
| 5,319,434 A | * | 6/1994 | Croteau et al. | 356/5 |
| 5,428,439 A | * | 6/1995 | Parker et al. | 356/5.01 |
| 5,457,639 A | * | 10/1995 | Ulich et al. | 364/516 |
| 5,469,250 A | * | 11/1995 | Holmes | 356/28 |
| 5,638,162 A | * | 6/1997 | Nettleton et al. | 356/4.02 |
| 5,760,905 A | | 6/1998 | Sasagawa | |
| 5,774,208 A | | 6/1998 | Abe | |
| 5,796,517 A | * | 8/1998 | Sensui et al. | 359/426 |
| 5,815,251 A | | 9/1998 | Ehbets et al. | |
| 5,886,340 A | | 3/1999 | Suzuki et al. | |
| 5,886,777 A | | 3/1999 | Hirunuma | |
| 5,923,468 A | | 7/1999 | Tsuda et al. | |
| 5,949,531 A | * | 9/1999 | Ehbets et al. | 356/5.01 |
| 5,949,548 A | | 9/1999 | Shirai et al. | |
| 6,072,642 A | | 6/2000 | Shirai | |
| 6,115,114 A | * | 9/2000 | Berg et al. | 356/5.13 |
| 6,194,694 B1 | | 2/2001 | Shirai | |
| 6,226,076 B1 | * | 5/2001 | Yoshida | 356/5.06 |
| 6,324,024 B1 | * | 11/2001 | Shirai et al. | 359/884 |

FOREIGN PATENT DOCUMENTS

DE        19840049         9/2000

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

An electronic distance meter includes a sighting telescope having an objective lens for sighting an object; a reflection member positioned behind the objective lens; an optical distance meter which includes a light-transmitting optical system for transmitting a measuring light via the reflection member and the objective lens, and a light-receiving optical system for receiving light which is reflected by the object, subsequently passed through the objective lens and not interrupted by the reflection member; a beam-diameter varying device, provided in association with the light-transmitting optical system, for varying a beam diameter of the measuring light; and a controller which varies the beam diameter via the beam-diameter varying device in accordance with a distance from the object to the electronic distance meter.

23 Claims, 9 Drawing Sheets

ELECTRONIC DISTANCE METER

BACKGROUND OF THE INVENTION

1. Field of the Invention

The present invention relates to an electronic distance meter having a sighting telescope.

2. Description of the Related Art

When a surveyor measures the distance between two points, an electronic distance meter (EDM) is generally used. An electronic distance meter calculates the distance via the phase difference between a projecting light (external light) and a reflected light and via the initial phase of an internal reference light, or via the time difference between the projecting light and the reflected light.

A typical electronic distance meter is provided, behind the objective lens of a sighting telescope thereof, with a light transmitting mirror (reflection member) positioned on the optical axis of the sighting telescope to project the measuring light (externally-projecting light) toward a target (sighting object) through the center of the entrance pupil of the objective lens of the sighting telescope. The light which is reflected by the target to be passed through the objective lens of the sighting telescope passes the peripheral space of the light transmitting mirror to be captured via a wavelength selection filter and a light receiving mirror.

In such an electronic distance meter, the light which is reflected by the target to be passed through the objective lens of the sighting telescope is interrupted by the aforementioned light transmitting mirror by a greater amount as the target is closer to the electronic distance meter. If the light which is reflected by the target to be passed through the objective lens of the sighting telescope is interrupted by the light transmitting mirror by a great amount, the light amount of the incident light upon the aforementioned light receiving mirror decreases, which deteriorates the precision in measuring the object distance. If the target is very close to the electronic distance meter, the light which is reflected by the target to be passed through the objective lens of the sighting telescope may not be incident on a light receiving element (photo-receiver) at all, which makes it impossible to perform a distance measuring operation. To prevent these problems from occurring, various methods have been proposed.

SUMMARY OF THE INVENTION

The present invention has been devised in view of the problems noted above, and accordingly, an object of the present invention is to provide an electronic distance meter which is free from the aforementioned problems without deteriorating the performance characteristics of the distance measuring operation of the electronic distance meter with a complicated system.

Another object of the present invention is to provide an electronic distance meter equipped with an autofocus system which is free from the aforementioned problems without deteriorating the performance characteristics of the distance measuring operation of the electronic distance meter with a complicated system.

To achieve the objects mentioned above, according to an aspect of the present invention, an electronic distance meter including a sighting telescope having an objective lens for sighting an object; a reflection member positioned behind the objective lens; an optical distance meter which includes a light-transmitting optical system for transmitting a measuring light via the reflection member and the objective lens, and a light-receiving optical system for receiving light which is reflected by the object, subsequently passed through the objective lens and not interrupted by the reflection member; a beam-diameter varying device, provided in association with the light-transmitting optical system, for varying a beam diameter of the measuring light; and a controller which varies the beam diameter via the beam-diameter varying device in accordance with a distance from the object to the electronic distance meter.

Preferably, the controller controls the beam-diameter varying device to increase the beam diameter when the object is in a predetermined short distance range.

In an embodiment, the electronic distance meter further includes a light-emitting element which emits the measuring light; wherein the beam-diameter varying device includes a lens, the beam-diameter varying device inserting and retracting the lens into and from an optical path of the light-transmitting optical system in front of the light-emitting element in accordance with the distance.

In an embodiment the lens is a negative lens, the beam-diameter varying device inserting the negative lens into the optical path when the object is in a predetermined shorter distance range, the beam-diameter varying device retracting the negative lens from the optical path when the object is in a predetermined longer distance range.

In an embodiment, the lens is a positive lens, the beam-diameter varying device inserting the positive lens into the optical path when the object is in a predetermined longer distance range, the beam-diameter varying device retracting the positive lens from the optical path when the object is in a predetermined shorter distance range.

In an embodiment, the electronic distance, meter further includes a light-emitting element which emits the measuring light, wherein the beam-diameter varying device includes a moving device for moving the light-emitting element in a direction of an optical axis of the light-transmitting optical system.

Preferably, the electronic distance meter further includes a lens position detection device which detects an axial position of a focusing lens of the sighting telescope which is moved in an optical axis thereof to bring the object into focus; wherein the beam-diameter varying device is operated in accordance with the axial position of the focusing lens that is detected by the lens position detection device.

Preferably, the reflection member is made of a parallel-plate mirror having front and rear surfaces parallel to each other, wherein the front surface faces the objective lens and is formed as a light transmitting mirror.

In an embodiment, the light-transmitting optical system includes a collimating lens positioned in front of the light-emitting element, the beam-diameter varying device inserting and retracting the lens into and from the optical path of the light-transmitting optical system in front of the collimating lens in accordance with the distance.

In an embodiment, the light-receiving optical system includes a wavelength selection filter positioned between the objective lens and the focusing lens.

In an embodiment, the beam-diameter varying device includes a motor for moving the lens.

According to another aspect of the present invention, an electronic distance meter equipped with an autofocus system is provided, including a sighting telescope for sighting an object, the telescope including an objective lens and a focusing lens; a reflection member positioned behind the objective lens; an optical distance meter which includes a light-transmitting optical system for transmitting a measuring light via the reflection member and the objective lens, and a light-receiving optical system for receiving light which is reflected by the object, subsequently passed through the objective lens and eventually not interrupted by the reflection member; a beam-diameter varying device, provided in association with the light-transmitting optical system, for varying a beam diameter of the measuring light; a focus detecting device for detecting a focus state of the sighting telescope; an autofocus drive system which drives the focusing lens to bring the object into focus in accordance with the focus state detected by the focus detecting device; and a controller which varies the beam diameter via the beam-diameter varying device in accordance with a lens position of the focusing lens which is detected via the autofocus drive system.

In an embodiment, the controller controls the beam-diameter varying device to increase the beam diameter when the object is in a predetermined short distance range.

In an embodiment, the electronic distance meter further includes a light-emitting element which emits the measuring light; wherein the beam-diameter varying device includes a lens, the beam-diameter varying device inserting and retracting the lens into and from an optical path of the light-transmitting optical system in front of the light-emitting element in accordance with the distance.

In an embodiment, the lens includes a negative lens, the beam-diameter varying device inserting the negative lens into the optical path when the object is in a predetermined short distance range, the beam-diameter varying device retracting the negative lens from the optical path when the object is in a predetermined long distance range.

In an embodiment, the lens includes a positive lens, the beam-diameter varying device inserting the positive lens into the optical path when the object is in a predetermined longer distance range, the beam-diameter varying device retracting the positive lens from the optical path when the object is in a predetermined shorter distance range.

In an embodiment, the electronic distance meter further includes a light-emitting element which emits the measuring light, wherein the beam-diameter varying device includes a moving device for moving the light-emitting element in a direction of an optical axis of the light-transmitting optical system.

The present disclosure relates to subject matter contained in Japanese Patent Application No. 2000-135561 (filed on May 9, 2000) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
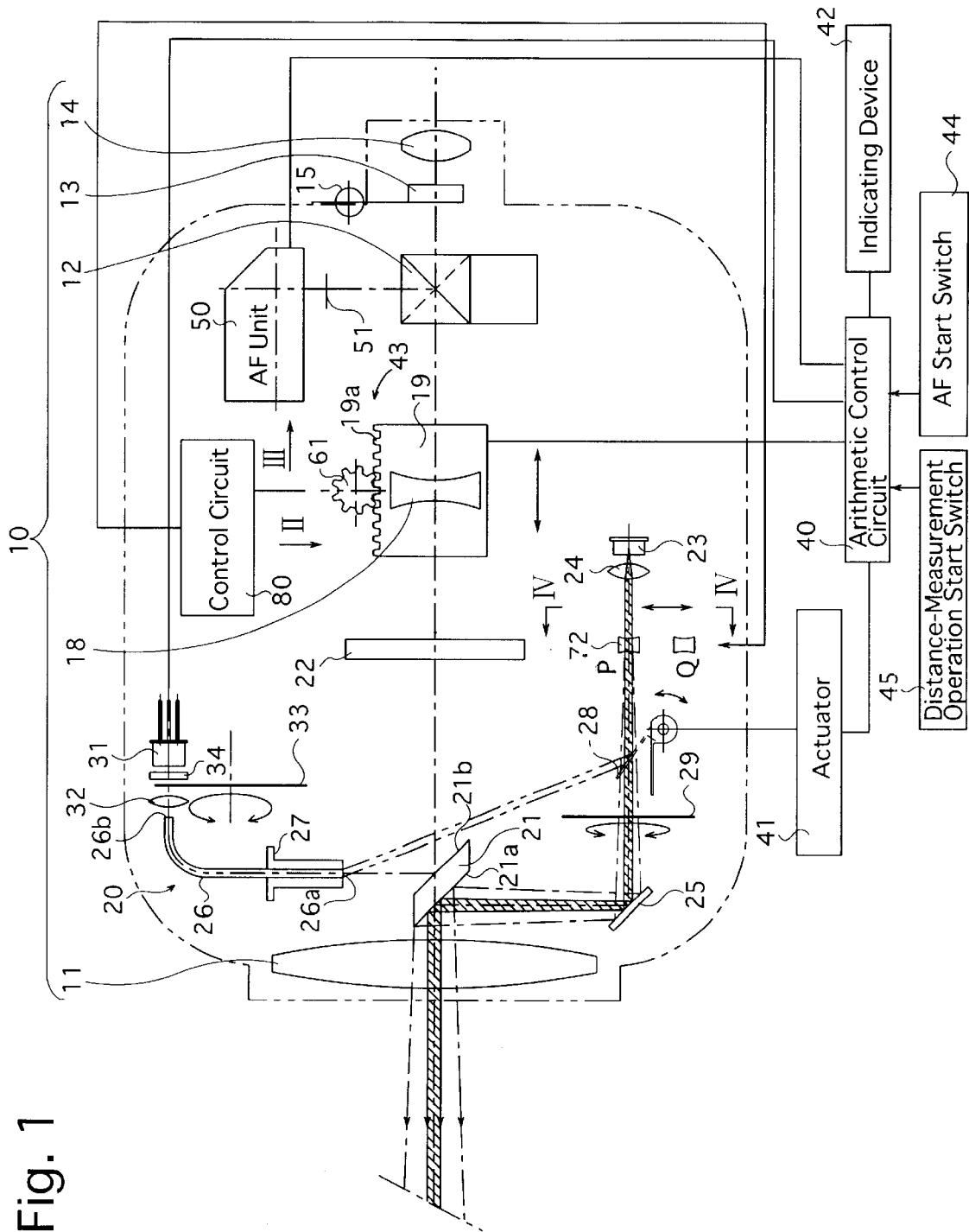
FIG. 1 is a schematic diagram of an embodiment of an electronic distance meter equipped with an autofocus system, according to the present invention.

FIGS. 1 through 10 show the first embodiment of an electronic distance meter (EDM) equipped with an autofocus system, according to the present invention. The electronic distance meter is provided with a sighting telescope (sighting telescope optical system) 10 and an optical distance meter 20. As shown in FIG. 1, the sighting telescope 10 is provided with an objective lens 11, a focusing lens 18, a Porro prism (erecting optical system) 12, a focal-plane plate (reticle plate) 13, and an eyepiece lens 14, in that order from the object side (i.e., left to right as shown in FIG. 1). The focal-plane plate 13 is provided thereon with a reticle (cross hair) 15.

Figure 2:
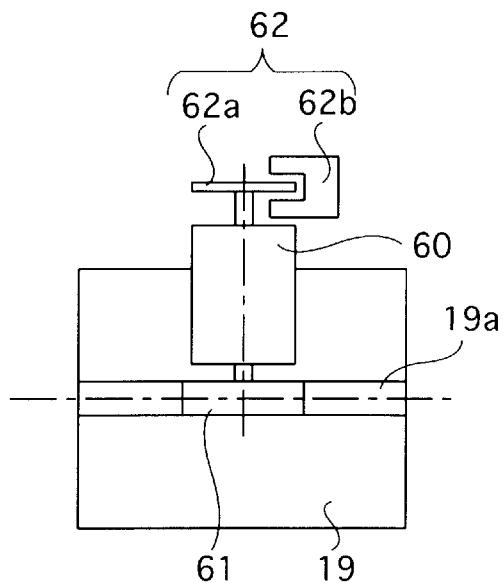
FIG. 2 is a schematic plan view of a focusing-lens drive mechanism provided in the electronic distance meter shown in FIG. 1, viewed in the direction of an arrow II shown in FIG. 1.

The focusing lens 18 is supported by a lens frame 19. The lens frame 19 is guided in a direction of an optical axis of the sighting telescope optical system, and is provided with a rack 19a which extends in the optical axis direction. The electronic distance meter is provided therein with a motor 60 (see FIG. 2). A pinion 61 which is in mesh with the rack 19a is fixed to a rotary drive shaft of the motor 60. With this structure, driving the motor 60 causes the focusing lens 18 to move, which is supported by the lens frame 19, in the optical axis direction. The image of an object (sighting object) that is formed through the objective lens 11 can be precisely focused on the front surface (the surface facing the objective lens 11) of the focal-plane plate 13 by adjusting the axial position of the focusing lens 18 in accordance with the distance of the sighting object with respect to the sighting telescope 10. The user (surveyor) of the surveying instrument sights a magnified image of the sighting object, which is focused on the focal-plane plate 13, via the eyepiece 14. As shown in FIG. 2, the electronic distance meter has an encoder (angle sensor/lens position detection device) 62 provided in association with the motor 60. In the illustrated embodiment, the encoder 62 is an optical encoder which includes a rotary disc 62a having a plurality of radial slits (not shown) and a photo-sensor 62b having a light emitter and a light receiver which are positioned on the opposite sides of the rotary disc 62a. The amount of rotation (angle of rotation) of the motor 60 is detected with the encoder 62.

The electronic distance meter is provided, behind the objective lens 11 of the sighting telescope 10, with a light transmitting/receiving mirror (reflection member) 21 and a wavelength selection mirror (wavelength selection filter) 22, which are arranged in that order from the object side. The light transmitting/receiving mirror 21 is made of a parallel-plate mirror having front and rear parallel surfaces positioned on the optical axis of the objective lens 11. The front surface of the parallel-plate mirror which faces the objective lens 11 is formed as a light transmitting mirror 21a, while the rear surface of the parallel-plate mirror which faces the wavelength selection mirror 22 is formed as a light receiving mirror 21b. The light receiving mirror 21b and the wavelength selection mirror 22 are fundamental optical elements of a light-receiving optical system of the optical distance meter 20.

The optical distance meter 20 is provided with a light-emitting element (laser diode) 23 which emits light (measuring light) having a specific wavelength. The measuring light emitted from the light-emitting element 23 is incident on the light transmitting mirror 21a via a collimating lens 24 and a fixed mirror 25. The measuring light, emitted from the light-emitting element 23 to be incident on the light transmitting mirror 21a, is reflected thereby to proceed toward the sighting object along the optical axis of the objective lens 11. The collimating lens 24, the fixed mirror 25 and the light transmitting mirror 21a (light transmitting/receiving mirror 21) are fundamental optical elements of a light-transmitting optical system of the optical distance meter 20.

The portion of the measuring light which is reflected by the sighting object, subsequently passed through the objective lens 11 which is not interrupted by the light transmitting/receiving mirror 21 is eventually reflected back to the light receiving mirror 21b by the wavelength selection mirror 22. Thereafter, the light receiving mirror 21b reflects the incident measuring light so as to make the measuring light enter at an incident end surface 26a of a light receiving optical fiber 26. A fiber holder 27 supports the incident end of the light receiving optical fiber 26 which has the incident end surface 26a. The fiber holder 27 is immovably supported together with the light transmitting/receiving mirror 21 by a fixing device (not shown) provided in a space behind the objective lens 11.

The electronic distance meter is provided between an exit end surface 26b of the light receiving optical fiber 26 and a light-receiving element 31 with a condenser lens 32, an ND filter 33 and a band-pass filter 34, in that order from the exit end surface 26b to the light-receiving element 31. The light-receiving element 31 is connected to an arithmetic control circuit (controller) 40. The arithmetic control circuit 40 is connected to an actuator 41 which drives the switching mirror 28, and an indicating device (e.g., an LCD panel) 42 which indicates the calculated distance.

The electronic distance meter is provided between the light-emitting element 23 and the fixed mirror 25, on a distance-measuring optical path, with a switching mirror 28 and an ND filter 29. The light (measuring light) emitted by the light-emitting element 23 is incident on the fixed mirror 25 when the switching mirror 28 is retracted from the distance-measuring optical path between the collimating lens 24 and the fixed mirror 25, and the light (internal reference light) emitted by the light-emitting element 23 is reflected by the switching mirror 28 to be incident directly on the incident end surface 26a of the light receiving optical fiber 26 when the switching mirror 28 is positioned in the distance-measuring optical path between the collimating lens 24 and the fixed mirror 25. The ND filter 29 is used to adjust the amount of light of the measuring light incident on the sighting object 16.

As is known in the art, the optical distance meter 20 establishes two different states: one state wherein the measuring light emitted by the light-emitting element 23 is supplied to the fixed mirror 25, and another state wherein the same light (internal reference light) is directly supplied to the incident end surface 26a of the light receiving optical fiber 26, which are determined in accordance with the switching state of the switching mirror 28 driven by the arithmetic control circuit 40 via the actuator 41. As described above, the measuring light supplied to the fixed mirror 25 is projected toward the sighting object via the light-transmitting mirror 21a and the objective lens 11, and the measuring light reflected by the sighting object is incident on the incident end surface 26a via the objective lens 11, the wavelength selection mirror 22, and the light receiving mirror 21b. Thereafter, both the measuring light reflected by the sighting object to be eventually incident on the incident end surface 26a, and the internal reference light directly supplied to the incident end surface 26a via the switching mirror 28 are received by the light-receiving element 31. The arithmetic control circuit 40 detects the phase difference between the projecting light (external light) and the reflected light and the initial phase of the internal reference light, or the time difference between the projecting light and the reflected light, to calculate the distance from the electronic distance meter to the sighting object. The calculated distance is indicated by the indicating device 42. Such an operation of calculating the distance from the phase difference between the projecting light (external light) and the reflected light and from the initial phase of the internal reference light, or from the time difference between the projecting light and the reflected light is well known in the art.

Figure 3:
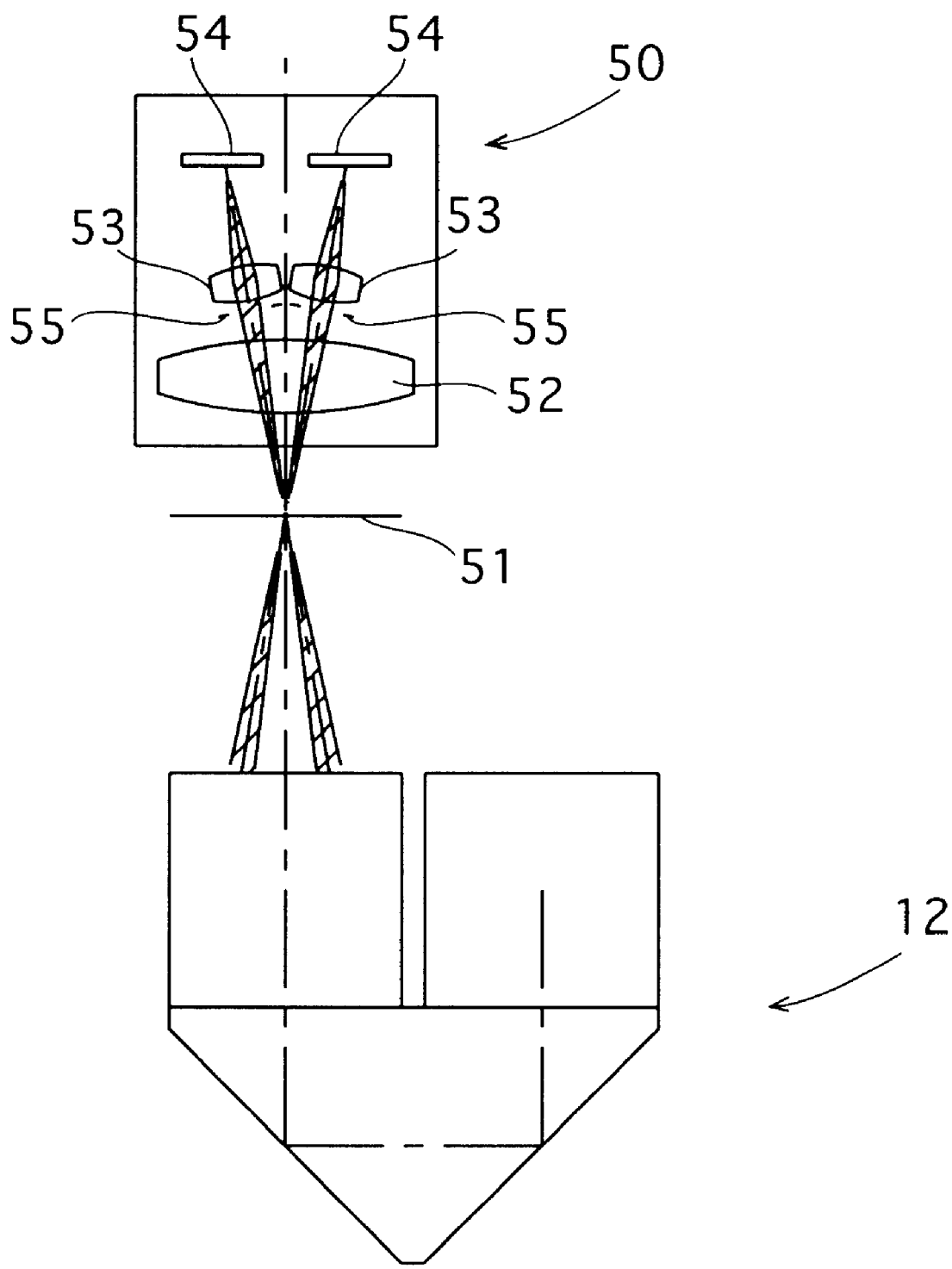
FIG. 3 is a conceptual diagram of a focus detecting device (an AF sensor unit/phase-difference detection type focus detecting device) and a Porro prism, as viewed in the direction of an arrow III shown in FIG. 1.

The Porro prism 12 is provided with a beam splitting surface which splits the incident light bundle into two light bundles, so that one of the two light bundles proceeds toward a phase-difference detection type AF sensor unit (focus detecting device) 50 while the other light bundle proceeds toward the eyepiece 14. Between the Porro prism 12 and the AF sensor unit 50 is formed a reference focal plane 51 which is located at a position optically equivalent to the position at which the reticle 15 of the focal-plane plate 13 is placed. The AF sensor unit 50 detects the focus state (i.e., the amount of defocus and direction of focal shift) on the reference focal plane 51. FIG. 3 shows a conceptual diagram of the AF sensor unit 50 and the Porro prism 12. The AF sensor unit 50 includes a condenser lens 52, a pair of separator lenses 53, a pair of separator masks 55 located in the close vicinity of the pair of separator lenses 53, and a pair of line sensors (e.g., multi segment CCD sensors) 54 located behind the respective separator lenses 53. The pair of separator lenses 53 are arranged apart from each other by the base length. The image of the sighting object 11 formed on the reference focal plane 51 is separated into two images by the pair of separator lenses 53 to be respectively formed on the pair of line sensors 54. Each of the pair of line sensors 54 includes an array of photoelectric converting elements.

Each photoelectric converting element converts the received light of an image into electric charges which are integrated (accumulated), and outputs as an integrated electric charge to the arithmetic control circuit 40 to constitute AF sensor data. The arithmetic control circuit 40 calculates an amount of defocus through a predetermined defocus operation in accordance with a pair of AF sensor data respectively input from the pair of line sensors 54. In an autofocus operation, the arithmetic control circuit 40 drives the focusing lens 18 to bring the sighting object into focus via the motor 60 in accordance with the calculated amount of defocus. The defocus operation is well-known in the art. An AF start switch 44 and a distance-measurement operation start switch 45 are connected to the arithmetic control circuit 40. The arithmetic control circuit 40, the motor 60, the rack 19a and the pinion 61 constitute an autofocus drive system.

Figure 4:
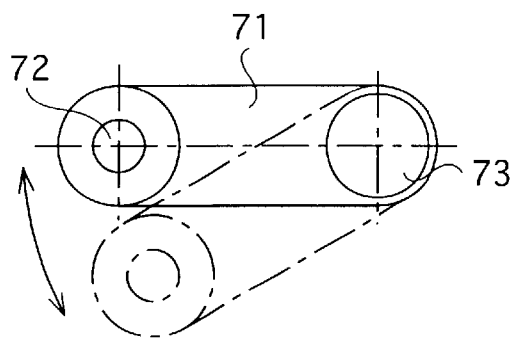
FIG. 4 is a schematic rear view of a negative lens drive mechanism, viewed in the direction of arrows IV shown in FIG. 1.
Figure 5:
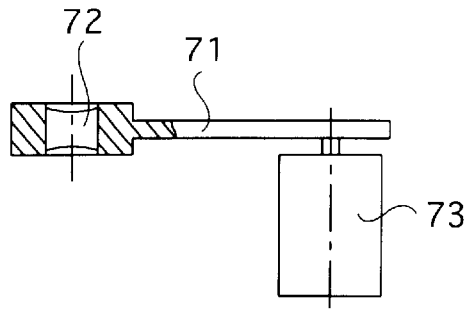
FIG. 5 is a view, partially in cross-section, of the negative lens drive mechanism shown in FIG. 4.

One feature of the electronic distance meter having the above described structure is that a retractable negative lens (diverging lens) 72 is inserted into and retracted from an optical path in front of the light-emitting element 23. The negative lens 72 is driven by a negative lens drive mechanism shown in FIGS. 4 and 5. As shown in FIGS. 4 and 5, the negative lens drive mechanism is provided with a rotational arm 71 which supports the negative lens 72 at the free end of the rotational arm 71. The negative lens drive mechanism is further provided with a lens drive motor 73. The other end of the rotational arm 71 is fixed to a rotary drive shaft of the lens drive motor 73. Forward and reverse rotation of the lens drive motor 73 causes the negative lens 72 to rotate about the rotary drive shaft of the lens drive motor 73 in forward and reverse directions to move to an operational position P, where the negative lens 72 is positioned in the distance-measuring optical path between the collimating lens 24 and the fixed mirror 25, and a retracted position Q, where the negative lens 72 is positioned outside the distance-measuring optical path between the collimating lens 24 and the fixed mirror 25, respectively. The lens drive motor 73 is connected to a control circuit 80 (see FIG. 1). The lens drive motor 73 is provided therein with an angle sensor (not shown) which is used for determining whether the negative lens 72 (or the rotational arm 71) is positioned at the operational position P or the retracted position Q. The rotational arm 71, the negative lens 72 and the lens drive motor 73 constitute a beam diameter varying device.

Figure 6:
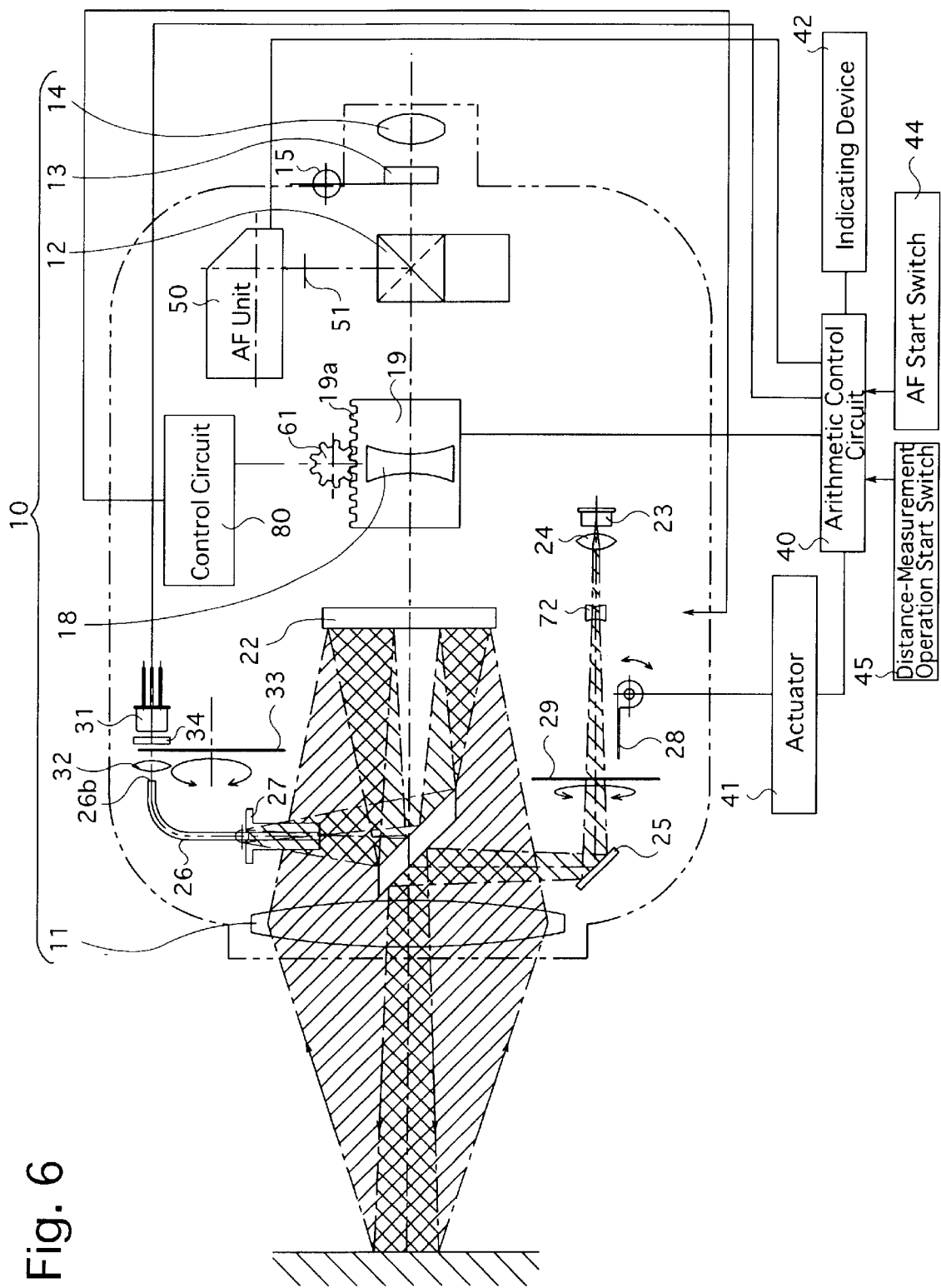
FIG. 6 is a view similar to that of FIG. 1 and illustrates the optical path of the divergent measuring light emitted by a light-emitting element, the optical path being hatched or cross-hatched for the purpose of illustration.
Figure 7:
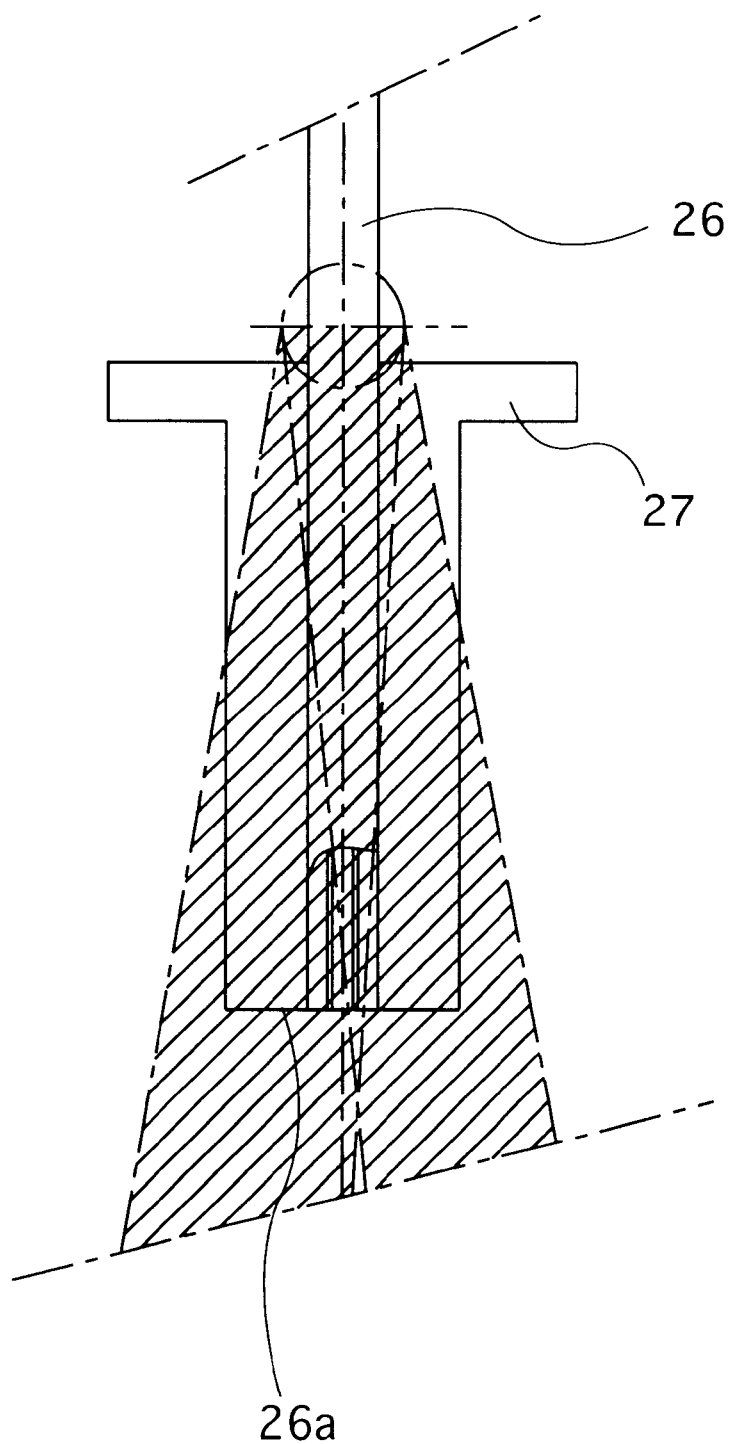
FIG. 7 is an enlarged side elevational view of an incident end of a light receiving optical fiber and a fiber holder which holds the incident end of the light receiving optical fiber.
Figure 8:
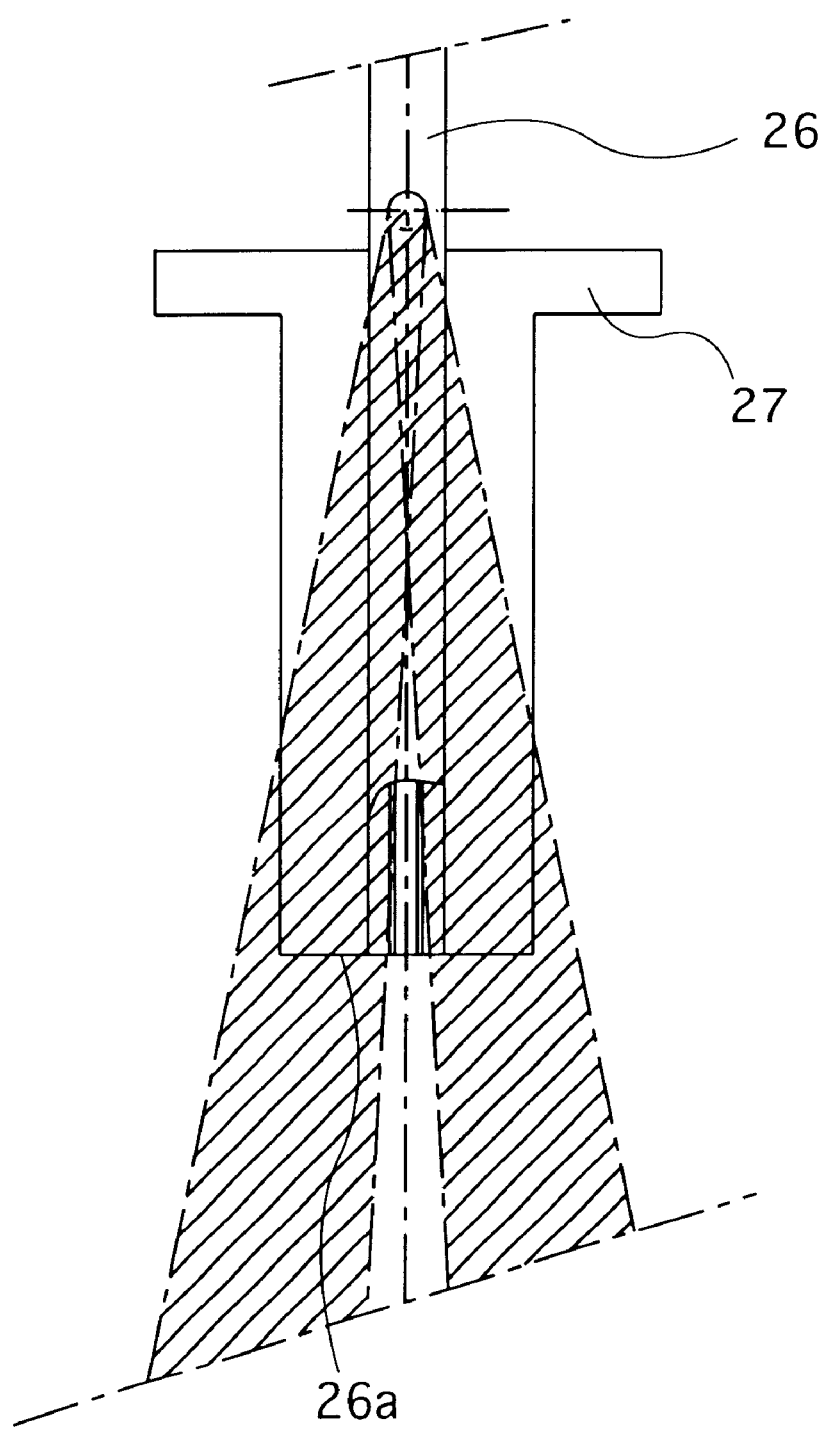
FIG. 8 is an enlarged side elevational view of the incident end of the light receiving optical fiber and the fiber holder which are shown in FIG. 6 in the case where no negative lens is positioned in front of a light receiving element when a sighting object is very close to the electronic distance meter.

The negative lens 72 is inserted into and retracted from the distance-measuring optical path between the collimating lens 24 and the fixed mirror 25 depending on the calculated distance (whether the sighting object is positioned at a short distance or a long distance). For instance, the negative lens 72 is inserted into the distance-measuring optical path to be positioned at the operational position P (i.e., in front of the condenser lens 24) if the calculated distance is equal to or smaller than five meters, while the negative lens 72 is retracted from the distance-measuring optical path to be positioned at the retracted position Q if the calculated distance is greater than five meters. In a state where the negative lens 72 is positioned at the operational position P, the measuring light which is emitted from the light-emitting element 23 is diverged through the negative lens 72 so that the divergent measuring light travels on the distance-measuring optical path therealong to be incident upon the sighting object via the ND filter 29, the fixed mirror 25, the light transmitting mirror 21a and the objective lens 11. Thereafter, since the divergent measuring light which is reflected by the sighting object to return to the electronic distance meter is incident upon the objective lens 11 with a greater beam diameter than that before being projected toward the sighting object from the objective lens 11, a majority of the returned measuring light is incident on the wavelength selection filter 22 without being interrupted by the light transmitting/receiving mirror 21. Namely, only a small minor portion of the returned measuring light is interrupted by the light transmitting/receiving mirror 21. The majority of the returned measuring light which is incident on the wavelength selection filter 22 is reflected the light receiving mirror 21b to be incident upon the incident end surface 26a of the light receiving optical fiber 26. Therefore, the returned measuring light which is incident upon the light receiving element 31 has a sufficient amount of light, so that the precision of the distance measuring operation of the electronic distance meter does not deteriorate. FIG. 6 shows a state where the divergent measuring light, which diverges via the negative lens 72, is incident upon the incident end surface 26a of the light receiving optical fiber 26. In FIG. 6, the optical path of the divergent measuring light is hatched or crosshatched for the purpose of illustration. FIG. 7 is an enlarged fragmentary view of the electronic distance meter shown in FIG. 6, showing the incident end (which includes the incident end surface 26a) of the light receiving optical fiber 26, and the fiber holder 27 that holds the incident end of the light receiving optical fiber. Supposing that the negative lens 72 is not disposed in front of the light-emitting element 23 when the sighting object is very close to the electronic distance meter, the light which is reflected by the sighting object to be passed through the objective lens 11 is interrupted by the light transmitting/receiving mirror 21 by a great amount. As a result, none of the reflected light or only a slight part thereof is incident upon the incident end surface 26a as shown in FIG. 8, which makes it either impossible to perform the distance measuring operation or definitely deteriorates the performance characteristics of the distance measuring operation.

Figure 9:
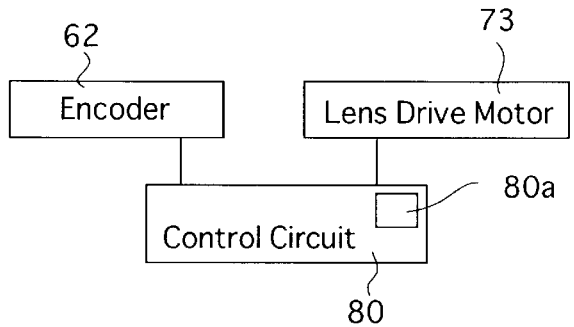
FIG. 9 is a block diagram of a control system for controlling the embodiment of the electronic distance meter shown in FIG. 1.

FIG. 9 is a block diagram of a control system including the encoder 62, the lens drive motor 73 and the control circuit 80. The control circuit 80 is provided therein with a memory (storing device) 80a in which information for determining whether the axial position of the focusing lens 18 which corresponds to the detected amount of rotation (angle of rotation) of the motor 60, which is detected with the encoder 62, is in a short distance range (short-distance in-focus range) or a long distance range (long-distance in-focus range) is stored. The short distance range (short-distance in-focus range) is determined as a distance range in which a majority of the measuring light which is reflected by the sighting object to be passed through the objective lens 11 is interrupted by the light transmitting/receiving mirror 21 to the extend where the light amount of the measuring light incident upon the incident end surface 26a of the light receiving optical fiber 26 becomes insufficient to perform the distance measuring operation. The limit of the short distance range which corresponds to the border between the short distance range and the long distance range can be determined by changing, e.g., the size of the light transmitting/receiving mirror 21 and the diameter of the light receiving optical fiber 26.

The electronic distance meter equipped with an autofocus system which has the above described structure performs a distance measuring operation in a manner such as described in the following description.

In the first step, a surveyor (user) aims the sighting telescope 10 at the sighting object so that the optical axis of the sighting telescope 10 is generally in line with the sighting object, while viewing the sighting object through a collimator (not shown) which is attached to the sighting telescope 10. In the second step, the surveyor depresses the AF start switch 44 to perform the aforementioned autofocus operation to move the focusing lens 18 to an in-focus position (in-focus state) thereof relative to the sighting object. In the third step, in a state where the sighting telescope 10 is in focus relative to the sighting object, the surveyor adjusts the direction of the sighting telescope 10 so that the reticle (cross hair) 15 viewed through the eyepiece 14 is precisely centered on the sighting object while looking into the eyepiece 14. In the fourth step, the surveyor depresses the distance-measurement operation start switch 45 to perform the aforementioned distance-calculating operation, wherein the calculated distance is indicated on the indicating device 42.

Figure 10:
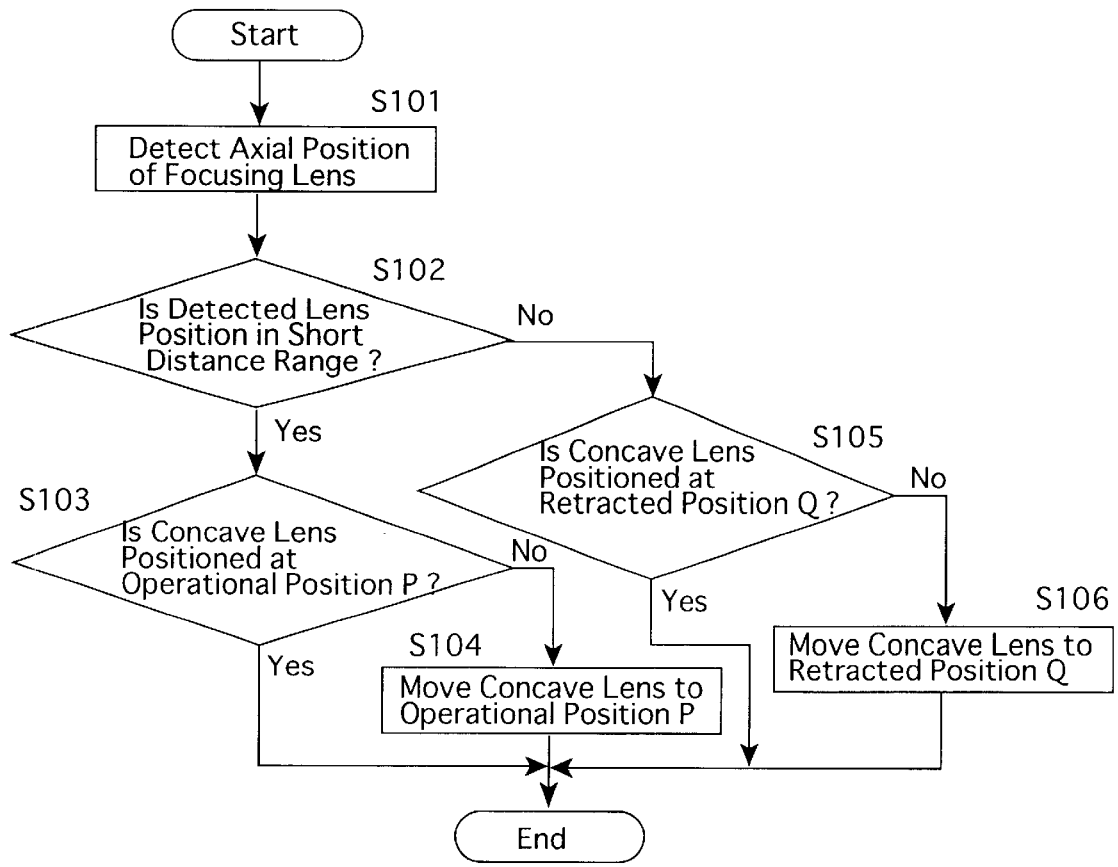
FIG. 10 is a flow chart showing a negative lens driving process which is performed by the control circuit shown in FIG. 9.

FIG. 10 shows a negative lens driving process (rotational arm driving process) which is performed immediately after the distance-measurement operation start switch 45 is turned ON. The process shown in FIG. 10 is performed by the control circuit 80. Firstly, the axial position of the focusing lens 18 is detected via the encoder 62 (step S101). Subsequently, it is determined whether the detected position of the focusing lens 18 is in the aforementioned short distance range with reference to the information stored in the memory 80a (step S102). If it is determined that the detected position of the focusing lens 18 is in the short distance range (if "Yes" at step S102), it is determined whether the negative lens 72 is positioned at the operational position P via the angle sensor provided in the lens drive motor 73 (step S103). If the negative lens 72 is not positioned at the operational position P (if "No" at step S103), the lens drive motor 73 is driven to move the negative lens 72 to the operational position P (step S104). If the negative lens 72 is positioned at the operational position P (if "Yes" at step S103), control ends. If it is determined at step S102 that the detected position of the focusing lens 18 is out of the short distance range (if "No" at step S102), it is determined whether the negative lens 72 is positioned at the retracted position Q via the angle sensor provided in the lens drive motor 73 (step S105). If the negative lens 72 is not positioned at the retracted position Q (if "No" at step S105), the lens drive motor 73 is driven to move the negative lens 72 to the retracted position Q (step S106). If the negative lens 72 is positioned at the retracted position Q (if "Yes" at step S105), control ends.

With this negative lens driving process, the negative lens 72 is positioned at the operational position P and the retracted position Q when the focusing lens 18 is positioned at a short distance and a long distance, respectively. Therefore, the negative lens 72 is positioned in accordance with the axial position of the focusing lens 18 positioned at an in-focus position thereof, namely, in accordance with the calculated distance so that the beam diameter of the measuring light changes in accordance with the distance from the electronic distance meter to the sighting object. When the sighting object is positioned at a long distance, if the negative lens 72 is not positioned in front of the collimating lens 24, the measuring light is incident upon the sighting object after being diverged sufficiently, and subsequently the measuring light is reflected by the sighting object to be incident upon the objective lens 11, so that the measuring light incident upon the incident end surface 26a of the light receiving optical fiber 26 has a sufficient light amount. Conversely, if the negative lens 72 is positioned in front of the collimating lens 24 when the sighting object is positioned at a long distance, the measuring light is diverged excessively to thereby decrease the intensity of the measuring light incident on the incident end surface 26a of the light receiving optical fiber 26. Accordingly, the negative lens 72 is positioned in front of the collimating lens 24 only when the sighting object is positioned at a short distance, i.e., when the axial position of the focusing lens 18 is in the short distance range.

Figure 11:
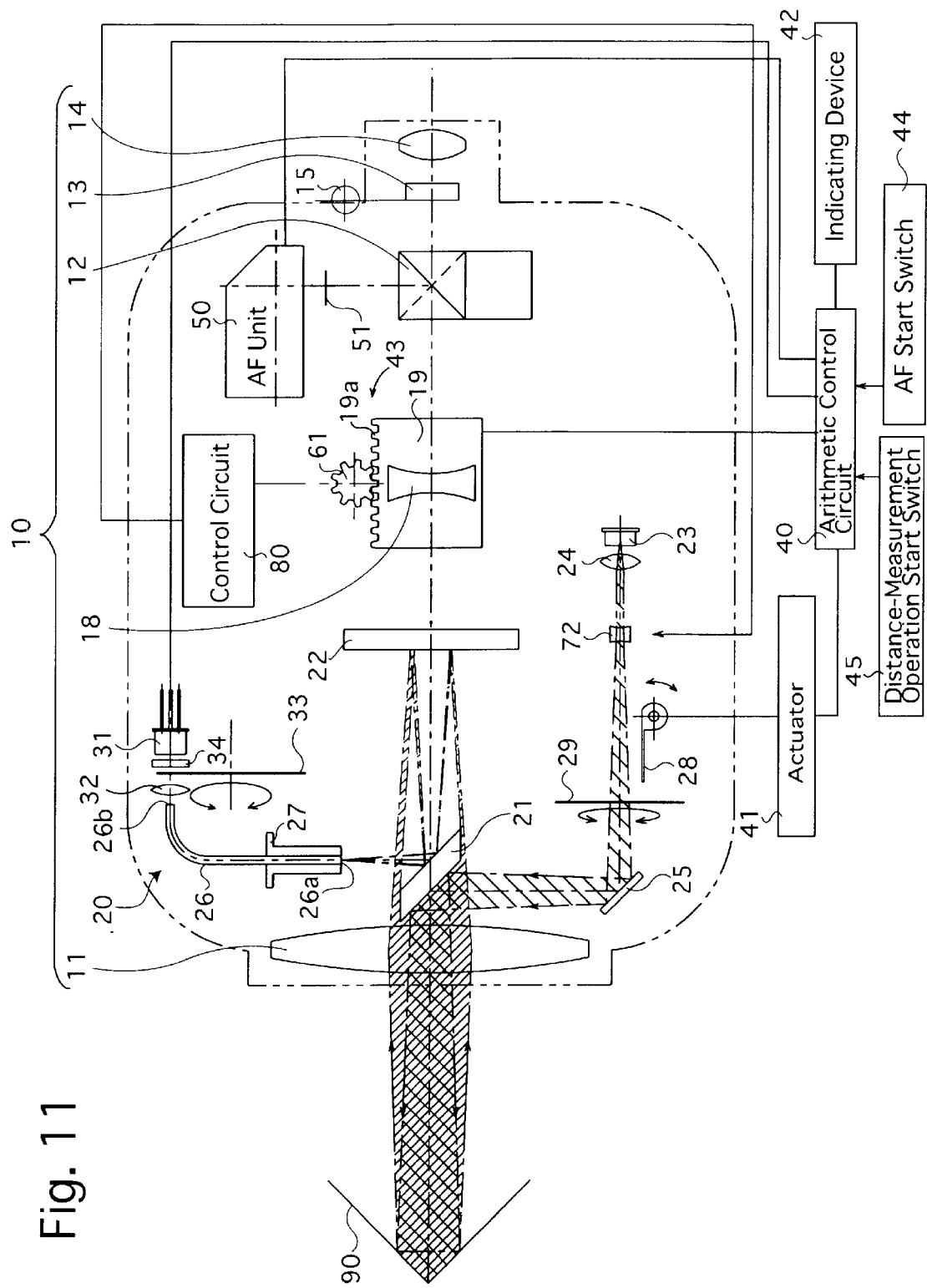
FIG. 11 is a view similar to that of FIG. 1 and illustrates the optical path of the measuring light emitted by the light-emitting element in the case where a corner cube reflector is placed at a point of measurement which is close to the electronic distance meter, the optical path being hatched or cross-hatched for the purpose of illustration.
Figure 12:
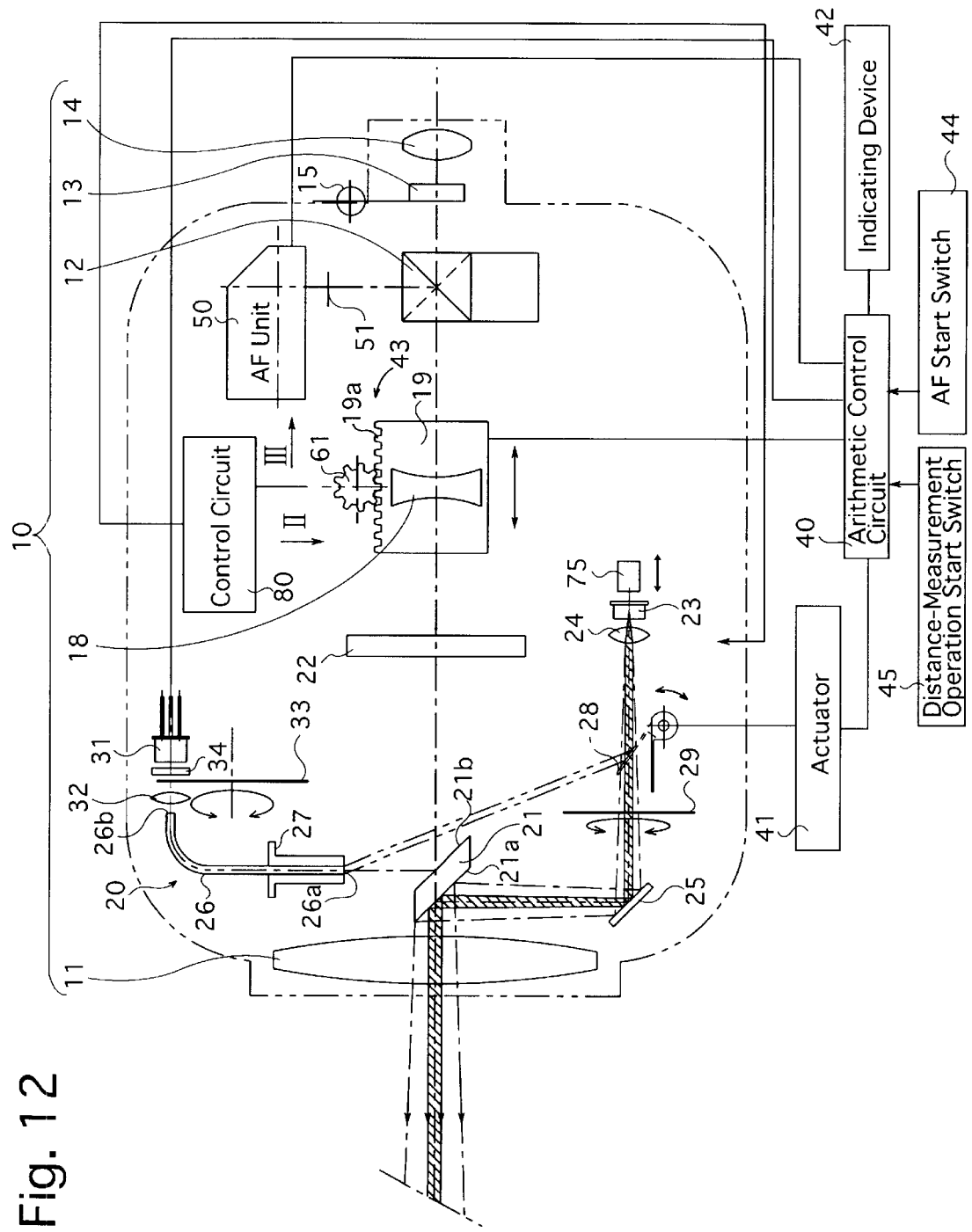
FIG. 12 is an alternative embodiment of an electronic distance meter wherein a moving device is provided as a beam-diameter varying device.

FIG. 11 illustrates the optical path of the measuring light emitted by the light-emitting element 23 in the case where a corner cube reflector 90 is placed at a point of measurement which is close to the electronic distance meter. The measuring light incident on the corner cube reflector 90 is diverged little by the corner cube reflector 90. Even in the case of using the corner cube reflector 90 placed at a short distance, the measuring light is projected toward the sighting object with a sufficient beam diameter due to the existence of the negative lens 72. Therefore, part of the measuring light reflected by the corner cube reflector 90 to be passed through the objective lens 11 is not interrupted by the light transmitting/receiving mirror 21 to be therefore incident on the incident end surface 26a of the light receiving optical fiber 26.

Although the above described electronic distance meter is of a type which is equipped with an autofocus system, the present invention can also be applied to an electronic distance meter equipped with a manual focus system. Furthermore, the negative lens 72 can be manually inserted into and retracted from the optical path between the collimating lens 24 and the fixed mirror 25. In this case it can be determined whether the negative lens 72 needs to be positioned at the operational position or the retracted position by firstly detecting the axial position of the focusing lens 18 after it is manually adjusted, and subsequently determining whether the distance which corresponds to the detected axial position of the focusing lens 18 is in the short distance range or the long distance range.

Although the negative lens 72 is used as a device for varying the beam diameter of the measuring light emitted from the light-emitting element 23, a positive lens can be used in place of the negative lens 72. In this case, the positive lens only needs to be controlled to be positioned in front of the collimating lens 24 when the calculated distance is in the long distance range, or to be retracted from the front of the collimating lens 24 when the calculated distance is in the short distance range. In this case, when the positive lens is positioned in front of the collimating lens 24, a substantially collimated light bundle is produced so that the collimating lens 24 and the positive lens actually constitute a collimating lens (since the collimating lens 24 is not strictly a collimating lens in this case). Therefore, when the positive lens is retracted from the light path, a divergent light bundle is produced through the 'collimating' lens 24, and accordingly, a distance calculation in the short distance range can be performed.

Alternatively, as a device for varying the beam diameter of the measuring light emitted from the light-emitting element 23, a piezoelectric element (moving device) 75 can be used to vary the beam diameter by moving the light-emitting element 23 with the piezoelectric element. In this case, the light-emitting element 23 only needs to be moved forward toward the collimating lens 24 when the sighting object distance is in the short distance range, or to be moved rearward when the sighting object distance is in the long distance range.

Although the Porro prism 12 is used as an erecting optical system and also as a beam splitting optical system for splitting the incident light bundle into two light bundles so that one of the two light bundles proceeds toward the AF sensor unit 50 while the other light bundle proceeds toward the eyepiece 14, any other optical elements can be used instead of the Porro prism 12.

In the above illustrated embodiment, the arithmetic control circuit 40 and the control circuit 80 can be integrated into a single control circuit.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. An electronic distance meter comprising:
   a sighting telescope having an objective lens for sighting an object;
   a reflection member positioned behind said objective lens;
   an optical distance meter which includes a light-transmitting optical system for transmitting a measuring light via said reflection member and said objective lens, and a light-receiving optical system for receiving light which is reflected by said object, subsequently passed through said objective lens and not interrupted by said reflection member;
   a beam-diameter varying device, provided in association with said light-transmitting optical system, for varying a beam diameter of said measuring light; and
   a controller which varies said beam diameter via said beam-diameter varying device in accordance with a distance from said object to said electronic distance meter.

2. The electronic distance meter according to claim 1, wherein said controller controls said beam-diameter varying device to increase said beam diameter when said object is in a predetermined short distance range.

3. An electronic distance meter comprising:
   a sighting telescope having an objective lens configured to sight an object;
   a reflection member positioned behind said objective lens;
   an optical distance meter which includes a light-transmitting optical system configured to transmit a measuring light via said reflection member and said objective lens, and a light-receiving optical system configured to receive light which is reflected by said object, subsequently passed through said objective lens and not interrupted by said reflection member;
   a beam-diameter varying device, provided in association with said light-transmitting optical system, configured to vary a beam diameter of said measuring light;
   a controller configured to vary said beam diameter via said beam-diameter varying device in accordance with a distance from said object to said electronic distance meter; and
   a light-emitting element which emits said measuring light;
   wherein said beam-diameter varying device comprises a lens, said beam-diameter varying device inserting and retracting said lens into and from an optical path of said light-transmitting optical system in front of said light-emitting element in accordance with said distance.

4. The electronic distance meter according to claim 3, wherein said lens comprises a negative lens, said beam-diameter varying device inserting said negative lens into said optical path when said object is in a predetermined shorter distance range, said beam-diameter varying device retracting said negative lens from said optical path when said object is in a predetermined longer distance range.

5. The electronic distance meter according to claim 3, wherein said lens comprises a positive lens, said beam-diameter varying device inserting said positive lens into said optical path when said object is in a predetermined longer distance range, said beam-diameter varying device retracting said positive lens from said optical path when said object is in a predetermined shorter distance range.

6. The electronic distance meter according to claim 1, further comprising a light-emitting element which emits said measuring light, wherein said beam-diameter varying device comprises a moving device for moving said light-emitting element in a direction of an optical axis of said light-transmitting optical system.

7. The electronic distance meter according to claim 1, further comprising a lens position detection device which detects an axial position of a focusing lens of said sighting telescope which is moved in an optical axis thereof to bring said object into focus;
   wherein said beam-diameter varying device is operated in accordance with said axial position of said focusing lens that is detected by said lens position detection device.

8. The electronic distance meter according to claim 1, wherein said reflection member is made of a parallel-plate mirror having front and rear surfaces parallel to each other, wherein said front surface faces said objective lens and is formed as a light transmitting mirror.

9. The electronic distance meter according to claim 3, wherein said light-transmitting optical system comprises a collimating lens positioned in front of said light-emitting element, said beam-diameter varying device inserting and retracting said lens into and from said optical path of said light-transmitting optical system in front of said collimating lens in accordance with said distance.

10. The electronic distance meter according to claim 7, wherein said light-receiving optical system comprises a wavelength selection filter positioned between said objective lens and said focusing lens.

11. The electronic distance meter according to claim 3, wherein said beam-diameter varying device comprises a motor for moving said lens.

12. An electronic distance meter equipped with an autofocus system, comprising:
   a sighting telescope for sighting an object, said telescope including an objective lens and a focusing lens;
   a reflection member positioned behind said objective lens;
   an optical distance meter which includes a light-transmitting optical system for transmitting a measuring light via said reflection member and said objective lens, and a light-receiving optical system for receiving light which is reflected by said object, subsequently passed through said objective lens and eventually not interrupted by said reflection member;
   a beam-diameter varying device, provided in association with said light-transmitting optical system, for varying a beam diameter of said measuring light;
   a focus detecting device for detecting a focus state of said sighting telescope;
   an autofocus drive system which drives said focusing lens to bring said object into focus in accordance with said focus state detected by said focus detecting device; and
   a controller which varies said beam diameter via said beam-diameter varying device in accordance with a lens position of said focusing lens which is detected via said autofocus drive system.

13. The electronic distance meter according to claim 12, wherein said controller controls said beam-diameter varying device to increase said beam diameter when said object is in a predetermined short distance range.

14. An electronic distance meter equipped with an autofocus system, comprising:

a sighting telescope configured to sight an object, said telescope including an objective lens and a focusing lens;

a reflection member positioned behind said objective lens;

an optical distance meter which includes a light-transmitting optical system configured to transmit a measuring light via said reflection member and said objective lens, and a light-receiving optical system configured to receive light which is reflected by said object, subsequently passed through said objective lens and eventually not interrupted by said reflection member;

a beam-diameter varying device, provided in association with said light-transmitting optical system, configured to vary a beam diameter of said measuring light;

a focus detecting device configured to detect a focus state of said sighting telescope;

an autofocus drive system configured to drive said focusing lens to bring said object into focus in accordance with said focus state detected by said focus detecting device;

a controller configured to vary said beam diameter via said beam-diameter varying device in accordance with a lens position of said focusing lens which is detected via said autofocus drive system; and a light-emitting element which emits said measuring light;

wherein said beam-diameter varying device comprises a lens, said beam-diameter varying device inserting and retracting said lens into and from an optical path of said light-transmitting optical system in front of said light-emitting element in accordance with said distance.

15. The electronic distance meter according to claim 14, wherein said lens comprises a negative lens, said beam-diameter varying device inserting said negative lens into said optical path when said object is in a predetermined short distance range, said beam-diameter varying device retracting said negative lens from said optical path when said object is in a predetermined long distance range.

16. The electronic distance meter according to claim 14, wherein said lens comprises a positive lens, said beam-diameter varying device inserting said positive lens into said optical path when said object is in a predetermined longer distance range, said beam-diameter varying device retracting said positive lens from said optical path when said object is in a predetermined shorter distance range.

17. The electronic distance meter according to claim 12, further comprising a light-emitting element which emits said measuring light, wherein said beam-diameter varying device comprises a moving device for moving said light-emitting element in a direction of an optical axis of said light-transmitting optical system.

18. The electronic distance meter according to claim 2, wherein when said object is in the predetermined short distance range, said controller controls said beam-diameter varying device to increase said beam diameter so that the diameter of said light beam incident on the object is increased.

19. The electronic distance meter according to claim 13, wherein when said object is in the predetermined short distance range, said controller controls said beam-diameter varying device to increase said beam diameter so that the diameter of said light beam incident on the object is increased.

20. The electronic distance meter according to claim 1, wherein said telescope further comprises an eyepiece lens.

21. The electronic distance meter according to claim 12, wherein said telescope further comprises an eyepiece lens.

22. The electronic distance meter according to claim 1, wherein said controller is configured to automatically vary said beam diameter.

23. The electronic distance meter according to claim 12, wherein said controller is configured to automatically vary said beam diameter.

* * * * *